United States Patent [19]
Hovorka

[11] 3,853,264
[45] Dec. 10, 1974

[54] FOOTBALL STATISTIC CALCULATING AND RECORDING RULE

[76] Inventor: J. Warren Hovorka, 10102 Verde Lomar Dr., Villa Park, Calif. 92667

[22] Filed: Mar. 29, 1973

[21] Appl. No.: 346,035

Related U.S. Application Data

[63] Continuation-in-part of Ser. No. 168,291, Aug. 2, 1971, abandoned, which is a continuation-in-part of Ser. No. 854,458, Sept. 2, 1969, abandoned.

[52] U.S. Cl............. 235/70 A, 116/120, 235/78 G, 273/134 CF
[51] Int. Cl............................................. G06g 1/02
[58] Field of Search.......... 235/702 A, 702 C, 78 G, 235/88 G; 116/120; 273/94 R, 131 C, 134 CF

[56] References Cited
UNITED STATES PATENTS

| | | | |
|---|---|---|---|
| 1,870,515 | 8/1932 | Kotlarz | 116/120 |
| 3,526,403 | 9/1970 | Clark | 273/134 CF |
| 3,712,974 | 1/1973 | Martin | 235/70 R |
| 3,729,130 | 4/1973 | Bortz | 235/70 R |

Primary Examiner—Lawrence R. Franklin
Attorney, Agent, or Firm—Robert E. Strauss

[57] ABSTRACT

A direct reading, calculating and recording slide rule is provided for determining and retaining statistics during a football game. The device has a body bearing a yardline grid and at least three slides which indicate: yards to go for the first down; yards gained or lost on the current play; and yards run back on a change in possession. In a preferred embodiment, at least one runner is provided to indicate the downed position of the football and, optionally, a second runner can be used to record the position of the change in possession. Optional slides can also be provided for calculating and recording total or net yardage, average yardage, etc.

14 Claims, 8 Drawing Figures

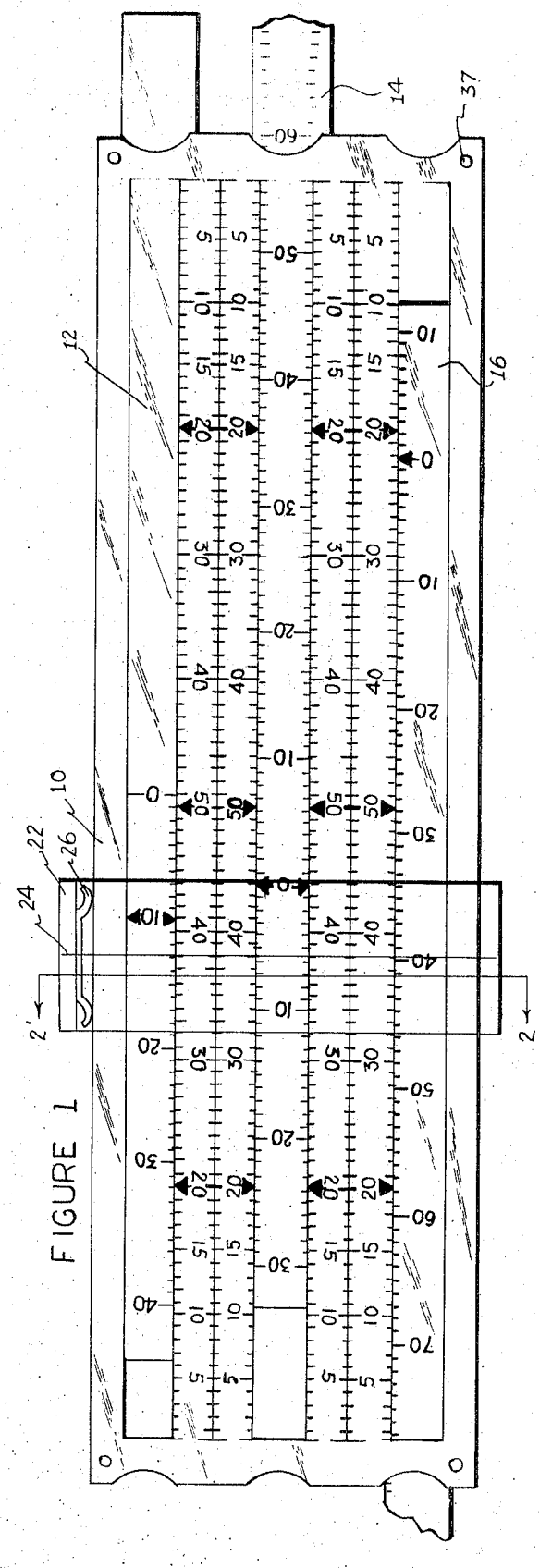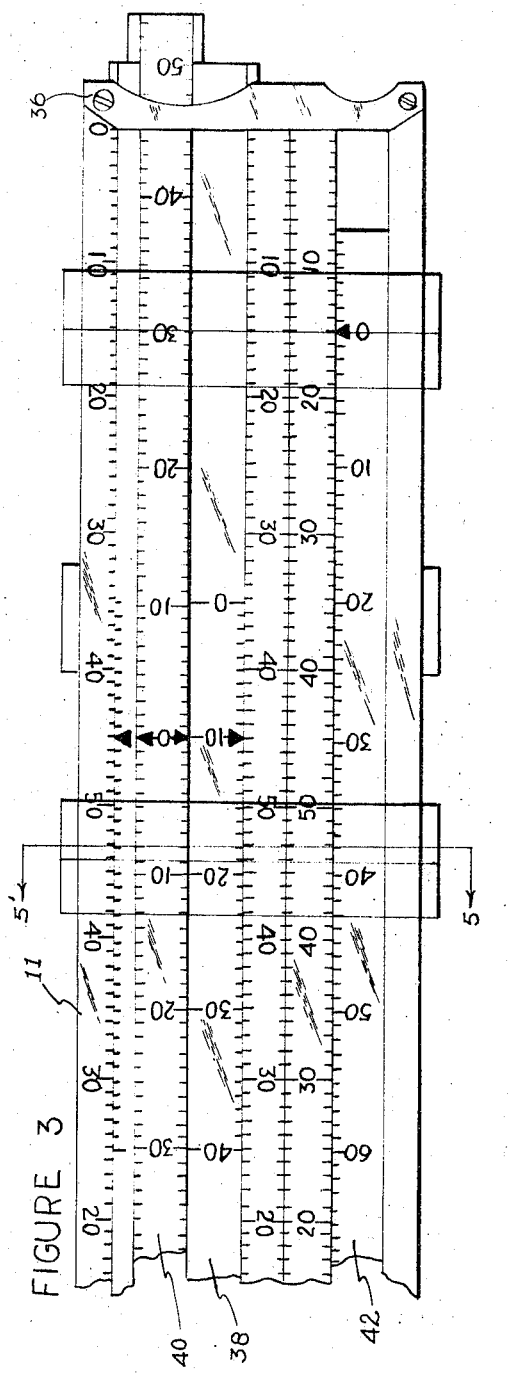

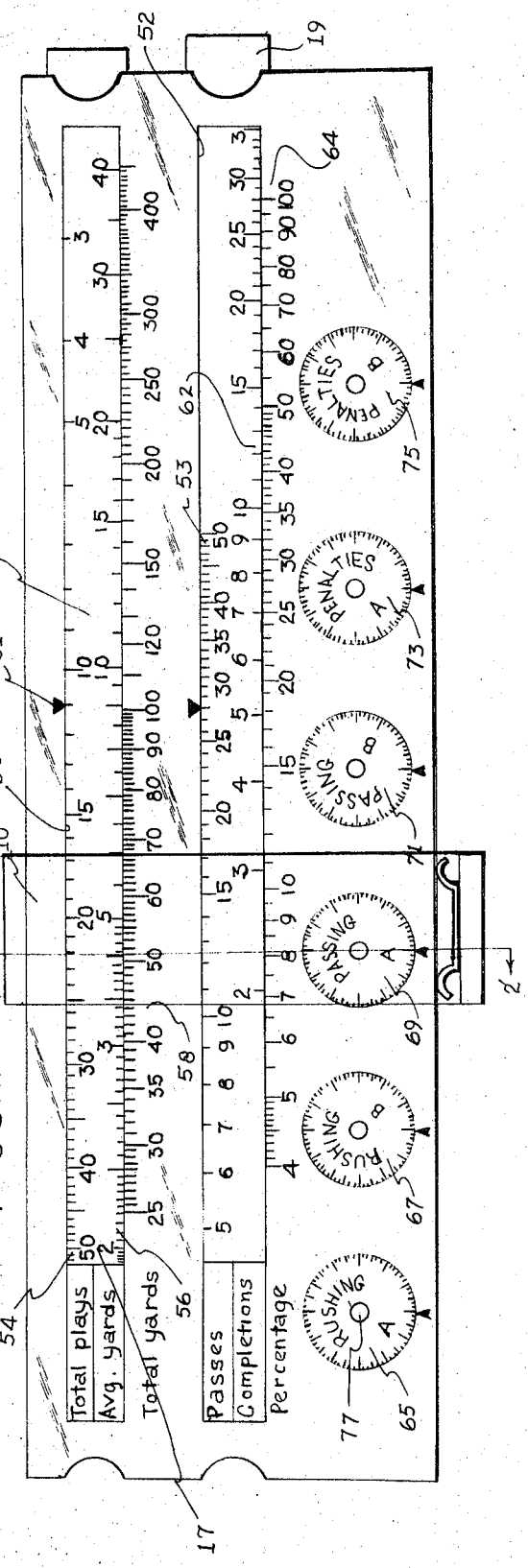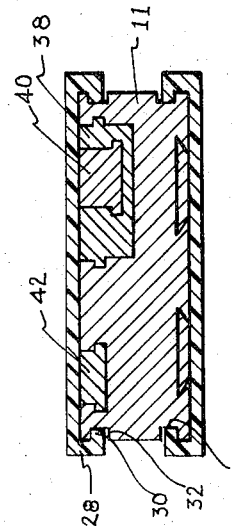

FOOTBALL STATISTIC CALCULATING AND RECORDING RULE

This application is a continuation-in-part of my copending application, Ser. No. 168,291, filed Aug. 2, 1971 which is a continuation-in-part of my prior application, Ser. No. 854,458, filed Sept. 2, 1969 both now abandoned.

DESCRIPTION OF THE INVENTION

The invention relates to calculating and recording devices and, in particular, relates to a device for computing and recording statistics during a football game.

The particular grid of a football field, with the yardlines in decreasing numerical progression from midfield to either goal line complicates the task of a statistician, coach, broadcaster, announcer, scoreboard keeper and spectator, and generally prevents spontaneous determination of yardage gained or lost on a particular play. Statistics are also maintained on many factors such as on individual as well as team efforts, thereby further complicating the task of a sports writer, statistician or other spectator.

Some prior attempts have been made to aid the task of statistic keeping; however, these attempts have not been notably successful. A game indicator is described in U.S. Pat. No. 546,959 to record the down and field position. An attempt was made to measure yardage with a slide rule device in U.S. Pat. No. 1,736,603 but the rule there described required prior computation of the net yardage of a particular play before the rule could be used. In all these prior attempts, no provision was made to determine and to record the statistics that occur during a change in possession of the ball, an event that often involves several significant statistics in rapid and uninterrupted sequence.

It is an object of this invention to provide a calculating device for spontaneously determining statistics during a football game.

It is a further object of this invention to provide such a device with direct reading means indicating distance gained or lost on a current play.

It is an additional object of this invention to provide such a device with direct reading means to indicate distance to go for a first down.

It is still a further object of this invention to provide such a device with direct reading means to indicate distance returned after any change in possession of the football.

It is an object of a preferred embodiment of the invention to provide means to compute average yards gained per play by a team's or an individual's efforts.

It is also an object of this invention to provide means to indicate the distance travelled of a kick off or punt before run back, a pass before an interception, or a run before a fumble.

It is an additional object of a preferred embodiment of the invention to provide means to record total yardage gained on a team's or an individual's efforts.

It is also an object of a preferred embodiment of the invention to provide means to indicate ball positions on penalty options.

Other and related objects will be apparent from the following description of the invention.

The aforementioned objects are obtained by the invention which comprises a generally elongated body calibrated as a grid-iron with at least three substantially parallel slides carried by the body with a yards to go scale on the first slide bearing a zero index with yard line calibration marks in arithmetic progression therefrom and with a first down line index at the tenth yard line calibration from the zero index; a yards gained or lost scale on the second slide bearing a line of play index with yard line calibration marks in arithmetic progression extending to either side thereof; and a yards returned scale on the third slide bearing a change in possession index and yard line calibration marks in arithmetic progression extending therefrom. Preferably, the body carries at least one runner bearing an index to facilitate reference between the grid lines of the body scales and the grid lines of the slide scales. Optionally, the body also carries a second runner with a similar index and, in some embodiments, additional scales or slides for computing yardage per play and for recording total yardage for each team or for selected individuals.

The invention will now be described with reference to the FIGURES, of which:

FIG. 1 is a view of the upper surface of the calculating device;

FIG. 2 is a view along line 2–2' of FIG. 1;

FIG. 3 is a view of the upper surface of an alternative device;

FIG. 4 is a view of the under side of the device of FIG. 1, with various optional features shown;

FIG. 5 is a view along line 5–5' in FIG. 4;

Figure 6:
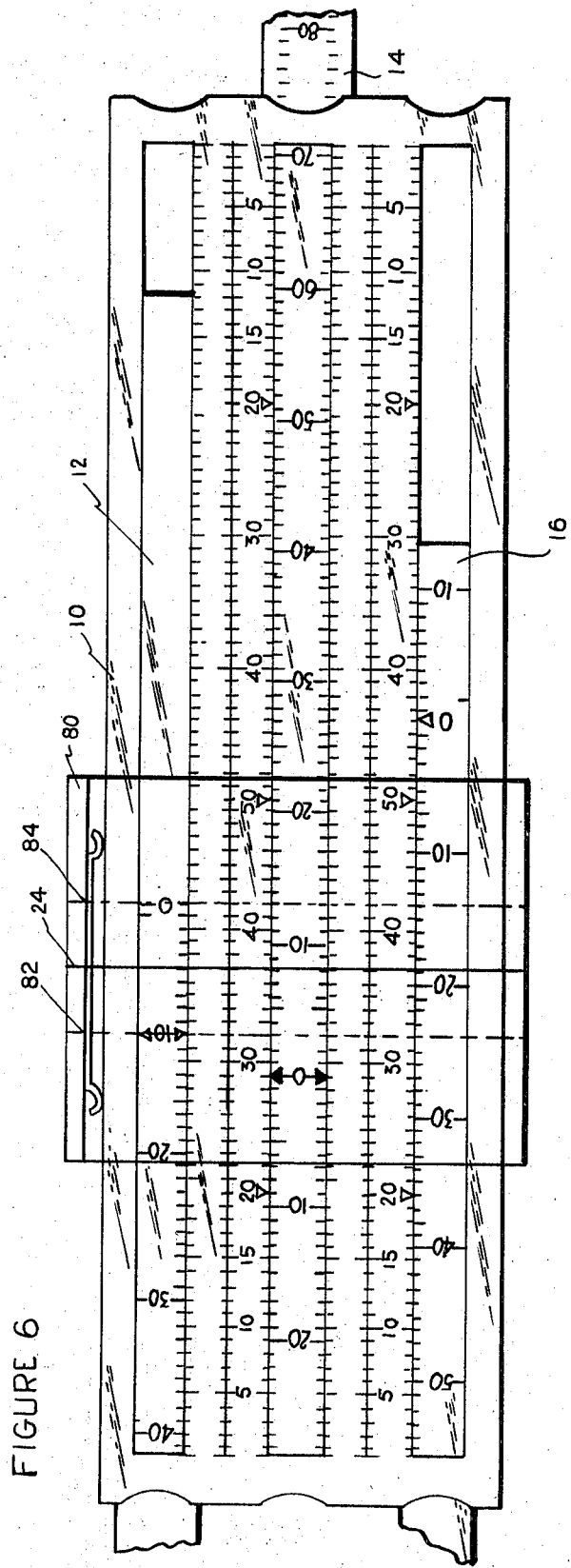
FIG. 6 is a view of a rule with a penalty option rider.

The device shown in FIG. 1 comprises a body 10 with three slides, 12, 14, and 16 disposed in longitudinally sliding engagement therewith. The slides are engaged with conventional joints for rules of this type, e.g., by joints shown in FIG. 2 or by dovetailed or tongue and groove joints shown in FIG. 5. The body and the slides are formed of conventional material, e.g., hardwood, metal, plastic, plastic or wax impregnated paperboard, etc. The rule can be employed without any runners; however, it is preferred to use at least one runner 22 with an indexing means such as hairline 24. If desired, as hereinafter discussed, two such runners can be used to facilitate determination of statistics which occur on changes in possession of the football. The runners can be formed in a conventional manner such as described in U.S. Pat. No. 1,181,672. In such construction, either an open ended box shape or a flat sheet construction is used. As shown in FIG. 2, the open ended box construction has upper and under plates 21 and 23, respectively, with a spring 26 biased between an edge of the rule and the inner side wall of the box. Both the upper and lower sides of the box can be formed of a transparent material or can be provided with a transparent window with the indexing means 24 carried thereon. Suitable materials are glass with a supporting metal frame or transparent organic polymers such as polymethylmethacrylate.

FIG. 4 is a view of the under side of the rule shown in FIG. 1. The under side of body 10 has at least one longitudinal slot 50 which is beneath the under side of slide 16. In this manner the under side 17 or slide 16 can be used for the calculation of statistics such as average yardage, passing percentage, etc. As shown in FIG. 2, body 10 can be a laminated assembly of an upper and lower plate, 8 and 9, respectively. The upper plate 8 has three longitudinal slots 13, 15 and 18 while the under plate 9 has two such slots 50 and 52. Two outboard rails, 25 and 27, and two inner rails, 29 and 31 are laminated between slotted plates 8 and 9. These rails are positioned between the solid portions of the plates and adjacent the slots in the plates so that the edges of the longitudinal slots lip over the rails. The entire assembly can be cemented or riveted together.

Slides 12, 14 and 16 are then slid into the assembly between the rails. As shown in FIGS. 2 and 4, plate 9 also has a plurality of bores to accomodate dials 65, 69 71, 73 and 75. These dials can be fastened to rail 29 by rivets such as 77 prior to assembly of the rule and are slightly thinner than plate 67,69 so as to be slightly recessed in the assembly.

Referring now to FIG. 4, the underside 17 of slide 16 is shown with two scales 54 and 56 calibrated in logarithmic progression with the scales being placed in reciprocal directions so that the numbers on scale 56 are 100 times the reciprocal value of the numbers on scale 54. A third scale 58 is placed on the body 10 and a calibration mark 61 is placed on body 10 opposite the 100 yard unit on this scale. Scale 54 is calibrated in total number of plays and has a range of values adequate for most games, e.g., from 1 to 50. Scale 58 is similarly calibrated in a scale adequate for most games such as from 25 to 450 yards. In operation of the slide, the total plays, e.g., 11 for a team is positioned beneath index 61 by moving slide 16. The average yards per play can then be read on scale 56 directly above the total yardage on scale 58.

A second slot 52 can also be provided to expose the underside of slide 14. This underside 19 can be provided with a scale 53 having a logarithmic progression of numbers from 2 to about 50, this range of values being adequate to cover the number of pass attempts usually made during a game. Scale 62 is a similar logarithmic progression of numbers placed on the underside 19 and offset from scale 53 with number 1.8 directly beneath number 10 on scale 53. The scale 62 is used to register the number of pass completions. A third scale 64, calibrated from 4 to 100 in logarithmic progression is placed on body 10 and an index mark is placed opposite 18 of scale 64. In operation, the slide is moved until the number of pass attempts, e.g., 28, is directly beneath the index mark. The percentage completion can then be read on scale 64 beneath the number of pass completions, e.g., if there were seven completions, the percentage FIG. 25 appears on scale 64 beneath number 7 of scale 62. This scale can be used for calculating percentages in other sports, e.g., the shooting percentage of field goals or free throws in basketball.

If desired, recording means can also be provided on the rule such as dial means 65 illustrated in FIG. 4 wherein total yards or other statistics can be maintained opposite an index such as 63. A series of such dials 67, 69, 71, 73 and 75 can be used on the rule to record all the significant statistics such as total yards gained, yards penalized, total plays, first downs, etc. As shown in FIG. 2, these dials are secured to body 10 by a fastener 77 which serves as the pivot for the dial.

FIG. 3 illustrates a rule having telescoping slides. In this structure, the yards to go slide 38 is carried in a longitudinal sliding joint on the rule body 11. The yards gained or lost slide 40 is carried by slide 38 in a similar joint. Slide 42, which indicates the yards returned on a change in possession, is substantially the same as slide 16 previously described. These slides and body 11 can be seen in cross sectional view in FIG. 5. Preferably, slide 38 fits in its track in body 11 more tightly than slide 40 fits in its track on slide 38 to insure that slide 38 remains at a preset position when slide 40 is moved.

The rule shown in FIGS. 3 and 5 can be constructed from a solid bar with grooves as shown in FIG. 5 cut longitudinally therein to accomodate the slides. Although not shown, dials similar to those of FIG. 4 can also be provided on this rule to permit retention of some of the statistics of a game.

A shown in FIG. 5, the runners can comprise a single flat plate with rims 28 having longitudinal lips 30 which engage grooves 32 along the edges of the rule body 11. In the device as shown, the upper and under surfaces of the rule have individual runners, each with their own edge grooves 32 and 34 so that calculations can be made on the under side without disturbing the positions of the upper side runners. End plate 36 can be provided as shown in FIG. 3 to retain the runners on the rule and to retain the body assembly or the rivets or other fasteners such as shown at 37 in FIG. 1 can be slightly raised above the surfaces of the rule body to retain the runners on the body.

The operation of the longitudinal slides of the rule is fairly apparent from the construction. As shown in FIG. 1, the team in possession had a first down on its own 41 yard line. Slide 12 has been moved to position its index at the 41 yard line. Slide 12 is moved only when the series of downs changes. On the first play, the team in possession moved the ball to the 44 yard line and this has been reflected in the setting of the index of slide 14 on the new line of scrimmage, the 44 yard line. The slide 14 is moved with every play, its index being set at the line of scrimage for the next play. On the next play, a pass is attempted, however, the passer is thrown on the 38 yard line. The rule of my invention provides a direct and spontaneous indication of the statistics by moving the runner to position its hairline on the 38 yard line where the ball is downed. The scale on slide 14 then reads the yards lost on the play as 6 yards directly beneath hairline 24.

To illustrate the use of the change in possession slide 16, let it be assumed that the passer succeeded in throwing the ball on the previously described play, but that the pass was intercepted on the opponent's 22 yard line by a player who returns it to the 38 yard line before being run out of bounds. Slide 16 is set with its index on the 22 yard line, as shown, and the runner is moved to the 38 yard line, as shown, directly indicating a return of 40 yards on the change in possession. When the rule is provided with two runners on the upper surface, one runner can be set on the 21 yard line where the interception occurs and the second runner can be set on the 38 yard line where the player is run out of bounds. Thereafter, slide 16 can be moved into position with its index on the 21 yard line to measure the yardage returned. The use of the two runners provides a quicker response to the rapidly changing statistics than the use of the index of slide 16 to record the point of the change in possession. The distance of the pass before the interception is shown on slide 14 opposite the 22 yard line as being 34 yards. In a similar fashion, slide 14 will indicate the distance of kicks, e.g., punts and kick-offs.

After a change in possession such as previously described, the rule can be reversed by moving the ball position from the 38 yard line at the left of the rule to the 38 yard line at the right of the rule and then reversing the rule, end for end. With this change, the rule can be used for reading the statistics of the opponent's offense without reversing the slides in the body of the rule. The numbers on the scales of the slides are positioned transversely on the slides so that they can be read from either side of the rule to permit this desirable flexability. Preferably, the numbers on the grid scale for body 10 are also positioned transversely for the same flexability; however, if desired, the numbers of the two scales between slides 12 and 14 and between slides 14 and 16 can be positioned to read to opposite sides of the rule.

FIG. 6 illustrates other settings for the rule. As shown, the first down index of slide 12 has been set on the 32 yard line and the hairline is set on the 37 yard line where the ball has been downed on a play, e.g., a pass or run. The play started on the 29 yard line since the index of the play scale 14 has been set on the 29 yard line reflecting, e.g., a three yard loss on the preceding play. The yard gained on the play appear beneath the hairline on scale 14 as 8 yards and the yards remaining to go for a first down appear beneath the hairline on scale 12 as 5 yards. The slides as illustrated in FIG. 6 show the yardage change in a change in possession, e.g., after a punt. In this illustration, the ball is punted to the opponent's 44 yard line where it is fielded and the index of slide 16 is set at this yard line. The ball is run back to the 37 yard line where it is downed and the hairline is set at this yard line. Scale 14 beneath the hairline indicates that a net yardage gain on the play was 8 yards after the run back with a total of 27 yards gained before the runback appearing on scale 14 opposite the index of scale 16. Scale 16 beneath the hairline reveals that the run back of the punt was 19 yards.

FIG. 6 also illustrates an alternative construction for the rider and hairline which is helpful in determining the yardages on penalty options. As shown the rider 80 extends 15 yards to either side of hairline 24. Five yards on either side of hairline 24 are index marks 82 and 84, or, in an alternative construction, rider 80 has its outside portions extending from 5 to 15 yards to each side of hairline 24 formed with a distinct color from the central portion. The rider can be used with this construction to determine quickly the yardage changes of 5 or 15 yard penalty options against either the offense or defense.

Other uses for the rule are illustrated in FIG. 6. In one application, the team in possession has a second down and 13 yards to go for a first down on its 29 yard line as shown by scales 12 and 14. The quarterback completes a pass to his tight end on the 37 yard line and the end's forward progress is stopped on the opponent's 44 yard line. To determine the individual statistics involved, the hairline is set on the 37 yard line as shown and the index of the slide 16 is set on the 44 yard line where the ball was downed. The yardage of the pass can be read on scale 14 beneath the hairline as 8 yards and the yardage of the end's run after the reception can be read as 19 yards on scale 16. The total yards gained appears as 27 yards on scale 16 directly across from the 0 index of scale 14. In a similar application, the scales 14 and 16 can be used together to read the separate statistics occurring on a run and lateral, e.g., if the quarterback had run to the 37 yard line and there lateralled the ball to a team mate who ran to the opponent's 44 yard line. The quarterback's yards gained is read on scale 14 and the team mate's gain read on scale 16 with the total yardage appearing on scale 16 opposite the index of scale 14.

The scales can also be jointly used for separating the statistics occurring on a kick without a runback. In this instance, the ball is punted and lands on the 37 yard line but rolls to the opponent's 44 yard line where it is downed. The hairline 24 is set on the 37 yard line where the ball lands and slide 16 is set with its index on the 44 yard line where the ball was downed. Scale 14, beneath the hairline, reveals an 8 yard punt in the air and scale 16, beneath the hairline, reveals a 19 yard roll. The total yardage for the kick appears as 27 yards opposite the zero index of scale 16.

The use of the rule on a penalty option can be illustrated by a play having a penalty called against the opponents on the 37 yard line. The hairline is set on the 37 yard line, the point of enforcement of the penalty and the right edge of rider 80 falls on the new line of scrimmage if the penalty is to be enforced, the opponent's 48 yard line. If the play had advanced the ball to the opponent's 44 yard line, the index of scale 16 would be set on the 44 yard line and a comparison of the index of scale 16 to the edge of rider 80 would reveal that the greater advance of the ball would be achieved by declining the penalty, with the actual yardage involved being read on scale 16 as 19 yards rather than the 15 yards from the penalty.

The rule can also be used to provide an instant reading of yardage for sustained drives. To illustrate, the hairline can be set where the series of plays is commenced, e.g., on the 32 yardline. Slide 16 is then set with its index on the yardline where the ball is downed, e.g., the opponent's 44 yardline. Directly beneath the hairline, scale 16 provides a direct reading of the total yardage for the immediately preceding series of plays, a total of 24 yards. The combination of slide 16 and the hairline can also be used to provide a reading of the net yardage on a change in possession. To illustrate, the hairline can be set on the 32 yardline which was the point of the first down where the series of plays started. After the change in possession, which results in the ball being downed on the opponent's 44 yardline, scale 16 will be set with its index on the 44 yardline and will indicate, beneath the hairline, that the net gain on the plays was 24 yards.

Figure 7:
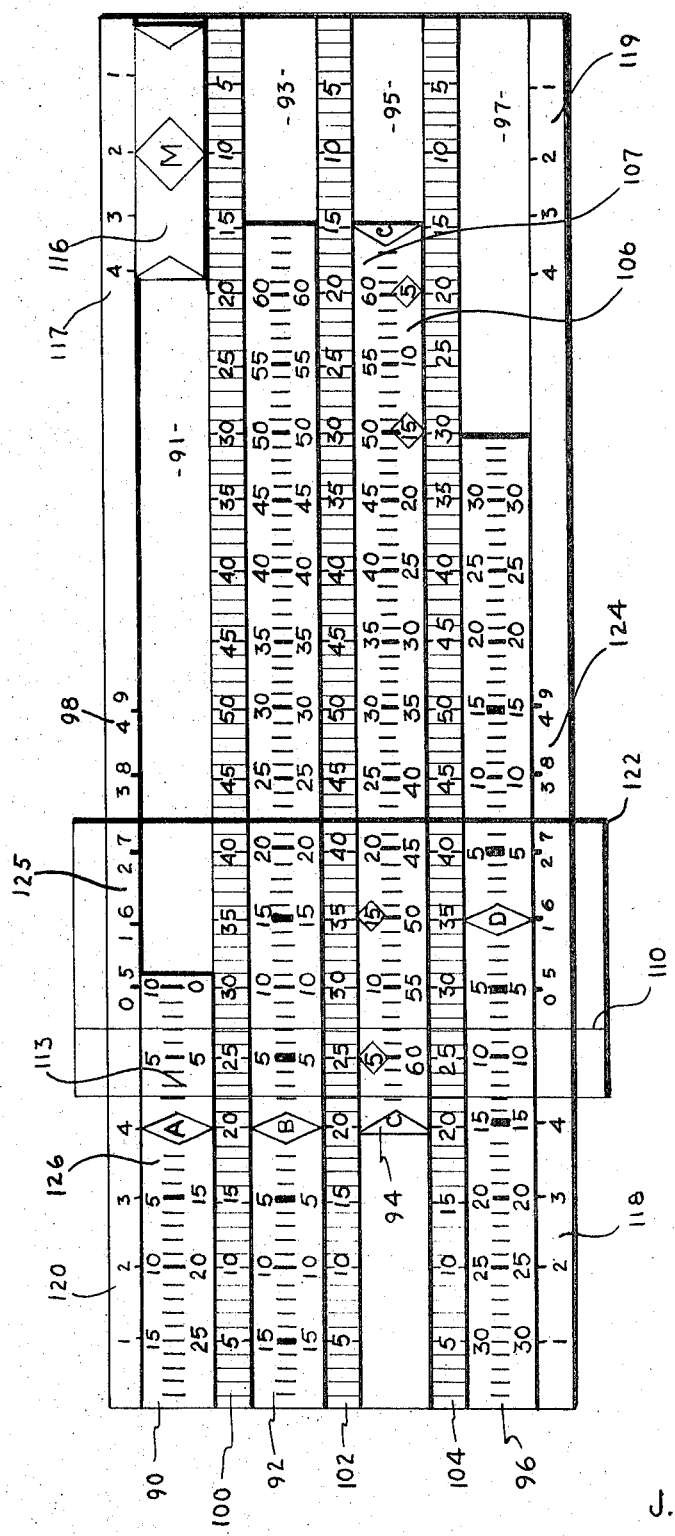
FIG. 7 illustrates a preferred rule with a penalty option slide.

FIG. 7 illustrates a preferred rule. This rule has four slides and these are slide 90 with index A, slide 92 with index B, slide 94 with index C and slide 96 with index D. The rule body 98 is similar to the bodies of the rules previously described and has dovetailed grooves 91, 93, 95 and 97 for each of the slides. The body is also calibrated in yardlines, preferably along the ribs between the slides as shown at 100, 102 and 104. Although the drawing shows the calibration lines marked at five yard intervals, any convenient marking can be used. Slides 90 and 92 function similarly to slides 12 and 14 previously described and the lower scale 106 of slide 94 functions similarly to the scale on slide 16, previously discussed. The upper scale on slide 94, however, adds another function to the rule. This scale is shown at 107 in FIG. 7 and cooperates with the left index C to indicate the statistics such as total yards in a drive and to break down the yardage change that occurs with plays such as a pass and run, run and lateral, and the ball roll on a kick.

Slide 96 can be used in penalized plays to indicate the yardline with the penalty assessed and to register the net gain or loss from the penalty. The slide can also be used with the scale on slide 92 and the hairline 110 of runner 122 to register the gain or loss in yards before and after a change in possession of the ball.

Considering the functions of the rule in greater detail, index C of slide 94 is set at the yardline for the first play that occurs after a change of possession. If there has been a previous possession by the team, index D of slide 96 can be set at the yardline where the team received the previous possession. The change in field position by the team that resulted from the play following their previous possession can then be read on the scale on slide 96 directly across from index C of slide 94. Index C can remain set throughout the series of plays, however, if a break down of yardage on plays such as a pass and run is desired, slide 94 can also be used for this purpose by resetting index C in the manner described hereinafter. Since it is preferred that the hairline 110 be set at the yardline where the ball is downed after each play, the total yards gained during the present series of plays can be read directly beneath the hairline on scale 107 of slide 94.

After slide 96 has been used to determine the change in field position, it can be set on the numerical scale 124 to register the total number of plays in the present drive. After each play the index D is advanced for this use.

As previously mentioned, slides 90 and 92 are used similarly to slides 12 and 14 with the yards to go for a first down being registered beneath the hairline on scale 113 of slide 90 and the total yards gained or lost being registered beneath the hairline on the scale of slide 92. As with slide 14, the index B of slide 92 is set at the line of scrimmage for each play.

It is frequently desirable to break down the statistics that occur on plays such as a pass and run, run and lateral, or kick. As previously mentioned, scale 94 can be used for this purpose. In a pass and run play, index C at the left of the slide 94 is set at the yardline where the pass is caught. The yards gained by the pass can then be read on slide 92 directly across from index C while the yards gained by the run after the reception can be read on slide 94 below the hairline 110. A similar procedure can be used with a run and lateral by setting the left index C at the yardline of the lateral and reading the yards gained before the lateral on slide 92 and the yards gained after the lateral on scale 107 of slide 94. In all cases, the total yards gained or lost can be read beneath the hairline on scale 92. When there is a kick without a runback, the left index C can be set at the yardline where the ball lands and the yardage of the roll of the ball can be read on scale 107 while the yards for the kick in the air can be read on slide 92 across from index C of slide 94. The total yards for the kick can be read on slide 92 beneath the hairline, which is set at the yardline where the ball is downed.

As previously mentioned, scale 106 of slide 94 cooperates with the right index C to register the yards returned following the reception of a kick or interception of a pass. This is accomplished by setting the right index C at the yardline where the ball is received and the scale 106 will register the yards returned beneath the hairline while the yards covered by the kick before its reception or the pass before its interception can be read on the scale of slide 92 directly across from the right index C. The net yardage gained or lost can be read beneath the hairline on slide 92.

When a penalty is to be enforced from the line of scrimmage, the yardline with the penalty can simply be read on scales 100, 102 or 104 from the 5 or 15 yard calibration mark on scale 92. If the penalty is to be enforced from a yardline other than the line of scrimmage, then scale 96 can be used to determine the yardline with penalty. In this use, the D index can be set at the yardline from which the penalty is to be enforced and the yardline with the penalty can be read on the fixed yardlines of scales 100, 102 or 104 directly across from the penalty distance, e.g., 5 or 15 yards on the scale of slide 96. The hairline, which is set at the yardline where the ball is downed will indicate the yardline without the penalty which will occur if the penalty is declined. A comparison of the yardline beneath the hairline to the yardline with the penalty as determined by use of slide 96 will quickly show the advantages or disadvantages of accepting or declining the penalty. The net total yardage of the play with the penalty can be determined by placing index D on the yardline with the penalty. The net total yardage of the play can be read either on scale 96 beneath the hairline or on scale 92 directly across from index D. The gain or loss resulting from the assesment of the penalty will be registered on slide 96 directly beneath the hairline.

The slide 96 can also be used to register the yardage gained or lost during a change-in-possession play. In this use, the index D can be set at the yardline where the change in possession occurs and the yards gained or lost on the play before the change in possession can be read on slide 92 directly across from index D while the yards gained or lost after the change in possession can be read on slide 96 beneath the hairline. The net total gain or loss from the play can be read on slide 92 directly below the hairline.

The rule can also be provided with an optional slide 116 that is mounted in groove 91 opposite the scale 117 of numbers from 1 to 4 which is positioned at both ends of groove 91 on the rule body. An index mark M is on slide 116 and this slide is used to record the down. When the down changes, after a play, index M is advanced. When slide 90 is moved to the far right of the slide, the slide 116 can be removed and inserted at the opposite end of groove 91 to cooperate with scale 120. Additional scales 118 and 119 can also be provided at the other corners of the rule as shown to permit use of slide 116 at any of the corners of the rule.

Runner 122 is shown constructed with a total width of 20 yards and with the hairline 110 placed one-fourth of the distance from one of the edges of this runner. This conveniently divides the runner into five and fifteen yard increments and thereby permits an optional use of the runner to determine yardlines in penalty situations. It is desirable to minimize the size of the runner and, accordingly, it is preferable to construct runner 122 with a total width of 15 yards with the hairline 110 placed one-third of the distance from one of the edges. The total width of the runner can then be used for fifteen yard penalties and the space between the hairline and the closest edge of the runner can be used for measurement of five yard penalties.

Various other scales can be provided on the rule to increase its usefulness. Scale 124 can be duplicated along the top of the scale as shown at 125. Slide 90 can also be provided with scale 126 which will register beneath the hairline, the net gain or loss from the first down yardline.

As previously mentioned, the hairline 110 is set at the yardline where the ball is downed at the end of each play and this is the preferred use for the hairline. Some users of the rule prefer not to use the hairline in this manner and sight across the rule without the aid of the hairline. In such instances, the hairline can be put to other uses such as keeping track of the total plays in a series on scales 124 or 125, etc.

Figure 8:
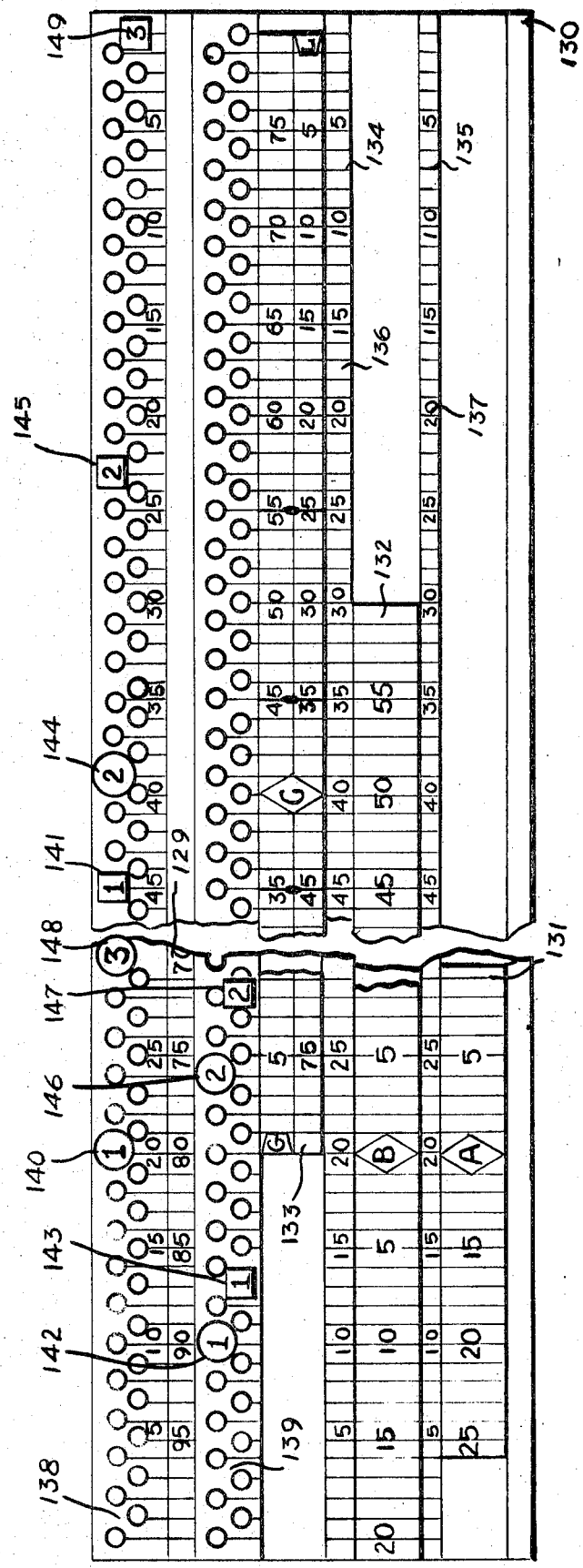
FIG. 8 illustrates a rule with statistics functions.

FIG. 8 illustrates another rule embodying the invention and having statistics recording functions which cooperate with the slides and the scales of the rule. This rule has a body 130 with three grooves in which are slidably mounted slides 131, 132 and 133. The grooves are separated by narrow ribs 134 and 135 which bear scales 136 and 137 that are calibrated in yardline divisions corresponding to those of the football field. Slide 131 bears index means A and is calibrated with lines in arithmetric progression to provide a yards to go for first down scale. This slide can be used in a manner similar to the use of slide 90 of FIG. 7 and slide 12 of FIGS. 1 and 6. Slide 132 bears an index means B and is calibrated with lines in arithmetric progression therefrom. This slide can be used in a manner similar to the use of slide 92 of FIG. 7 and slide 14 of FIGS. 1 and 6. Slide 133 has two indices, G and L, one at each end of the slide, with two scales which extend in opposite arithmetric progressions. This slide is similar to slide 94 of FIG. 7 and can be used in a similar manner to the use of that slide, however, the G and L indices refer, respectively, to gain or loss in yardage. A center index C can also be provided as shown with heavy calibration marks at 5 and 15 yard intervals at either side thereof. These provide indications for penalty options similar to the previously described use of runner 122.

The rule is shown in FIG. 8 without a runner and its hairline. The use of a runner is optional. Since the scales 136 and 137 are identical, any cross reference between the sliding scales and the fixed scales of the rule can be readily made without reliance on the hairline of a runner.

The rule shown in FIG. 8 also has a plurality of statistics recording means. These are in the form of a plurality of holes which are disposed across the upper portion of the rule. Two sets of holes, 138 and 139, are provided with a hole for each yardline on scales 136 and 137. The sets of holes can be staggered in two or more rows, as shown. These holes cooperate with marker means in the form of pegs to provide statistic recording means which can be used in cooperation with the slides of the rule. A scale 129 which is calibrated in yardlines extends in reverse arithmetric progression from the 50 yardline and appears on the rule between the two sets of holes.

A plurality of marker means in the form of pegs are provided for insertion into holes of the rule for recording statistics. One set of holes is assigned to each team and pegs of different shapes, color or other indicia can be used to record different statistics such as the use of green or round pegs to record the yardline at the start of each drive by a team and the yards to the opponent's goal line which, if the distance is greater than 50 yards, appears on scale 129. Red pegs, or square pegs, can be used to record the yardline at the end of each drive. If desired, each peg can be numbered, as shown, to indicate that it represents a statistic for the first, second, third, etc., drive by a team. At any time during the game, the average starting yardline for a team can be readily determined by averaging the positions of all the green pegs for that team. Similarly, the average ending yardline can be determined from the positions of the red pegs.

The rule is shown as it is used during a game and the following sequence of events can be recorded on the rule. After the opening kickoff, team A started a drive from its 20 yardline (80 yards from the opponent's goal line), peg 140, and moved to the 45 yardline of team B, peg 141, and punted. Team B started a drive on its 10 yardline (90 yards from its opponent's goal line), peg 142, and advanced the ball only to its 13 yardline before punting, peg 143. Team A began its second drive on the 39 yardline of team B, peg 144, and moved to the 24 yardline of team B where it lost the ball on a fumble, pegs 145 and 146. Team B moved to its 28 yardline and punted, peg 147. Team A began its third drive on its 30 yardline (70 yards from its opponent's goal line), peg 148, and drove the length of the field to score, peg 149.

The total of the yards from the opponent's goal line of the starting, round, pegs can be averaged to determine the average drive starting yardline for each team. This calculates to be the 37 yardline for team A or 63 yards from the opponent's goal line. Slide 133 can be used in cooperation with the pegs to determine a number of useful statistics. The distance between peg 140 and peg 144 can be measured by the scale of slide 133 to indicate that team A gained 41 yards in field position on the exchange of punts with team B. Similarly, the distance measured between peg 144 and peg 148 indicates a loss of 31 yards in field position between drives 2 and 3. The furtherest penetration, other than a touchdown, by team A can be observed from the pegs to be the opponent's 25 yardline, peg 145. The distance gained for each drive can be determined by setting the G index of slide 133 on each starting yardline 140, 144 and 148 and observing the distance to pegs 141, 145 and 149, respectively, on the gained scale of the slide. If a team has a net loss on a series of plays, the extent of the loss can be determined by setting the L index of slide 133 on the starting yardline and reading the distance lost on slide 133. These distances measured for each drive can be summed and the sum divided by the number of drives to calculate another quite useful statistic, the average yards gained or lost per drive.

It is frequently desired to know the average ending yardline for all drives which failed to culminate in a touchdown. This can be readily determined by averaging the positions of the square pegs such as 141 and 145 to determine that team A has an average ending yardline on the opponent's 35 yardline. When only two positions, square pegs 141 and 145, are averaged, the scales of slide 133 can be used to determine the midpoint between the two pegs. The procedure which has been described with regard to team A can be quickly repeated for team B.

The recording of yardlines for both teams A and B has been in a progression from left to right on the rule for both teams. This is preferred to avoid confusion between the pegs. The other scales of the rule can be used in a like fashion to avoid reversing the rule during its use. The illustration in FIG. 8 shows the scales with every fifth yardline numbered. This is intended only to simplify the illustration. In practice it is preferred to number every second yardline for rapid observation of the yardline during use of the rule.

The preceding description of the invention with reference to specific illustrations is intended only to illustrate the presently preferred embodiments of the invention. It is not intended that the invention be unduly limited by such description of specific illustrations, but instead, it is intended that the invention be defined by the elements and their obvious equivalents set forth in the following claims.

I claim:

1. A calculating device of the slide rule type useful for calculating and recording statistics during a football game, the combination comprising: a body, a graduated grid on said body corresponding to the yardlines of a football field, first, second and third parallel slides carried by and freely extendible to either side of said body, a yards to go scale for a first down along a portion of the first slide bearing a zero index with yardline calibration marks in arithmetric progression therefrom, a first down line index at the tenth yardline calibration from the zero index; a yards gained or lost scale on the second slide bearing a line of play index intermediate the length of said slide with yardline calibration marks in arithmetric progression extending to either side thereof; a yards returned scale on the third slide bearing a change in possession index and yardline calibration marks in arithmetric progression extending therefrom.

2. The device of claim 1 having in combination therewith at least one runner slidably mounted on said body and bearing an index traversing said body and said first, second and third slides.

3. The device of claim 1 wherein said slides are carried in grooves of said body with rib portions therebetween and wherein said rib portions bear graduated grids corresponding to the yardlines of a football field.

4. The device of claim 2 wherein a second runner bearing an index traversing said body and said first, second and third slides is slidably mounted on said body.

5. The device of claim 1 wherein said second slide is slidably mounted on the first slide.

6. The device of claim 2 wherein said runner bears indices at 5 and 15 yard positions for determination of penalty enforcement yardlines.

7. The device of claim 1 wherein said third scale is mounted in said device with its calibration marks in inverse progression to the calibration marks of said second scale.

8. The device of claim 1 wherein said body carries a fourth slide that has an index at a point intermediate its length and yardline calibration marks extending to either side thereof.

9. The device of claim 1 wherein said third slide bears an index at each end and a pair of scales calibrated in yardlines extending therebetween in inverse relationship to each other.

10. The device of claim 8 wherein said body carries a fifth slide opposite a progression of numbers from 1 to 4 calibrated on said body with an index on said fifth slide to register the down opposite said progression of numbers.

11. The device of claim 1 wherein the calibration of said scales comprises a series of numerals positioned transversely on said slides, thereby permitting said device to be reversed end for end upon changes in possession without losing legibility of said numerals.

12. The device of claim 1 having in combination therewith at least one additional slide with a numerical sequence in logarithmic progression and a cooperating logarithmic calibration on said body adjacent said slide for calculation of average or percentage statistics.

13. The device of claim 1 having in combination therewith means for recording and retaining, during use of the device, a plurality of statistically significant yardlines for each team which comprises a plurality of marker means with means to secure said marker means at said significant yardline calibrations marks.

14. The device of claim 13 wherein said marker means comprise a plurality of pegs and said attachment means comprise a plurality of holes therefor.

* * * * *